Nov. 11, 1930.  C. W. BOOTH  1,781,491
UNCOUPLING DEVICE
Filed Dec. 4, 1926  2 Sheets-Sheet 1
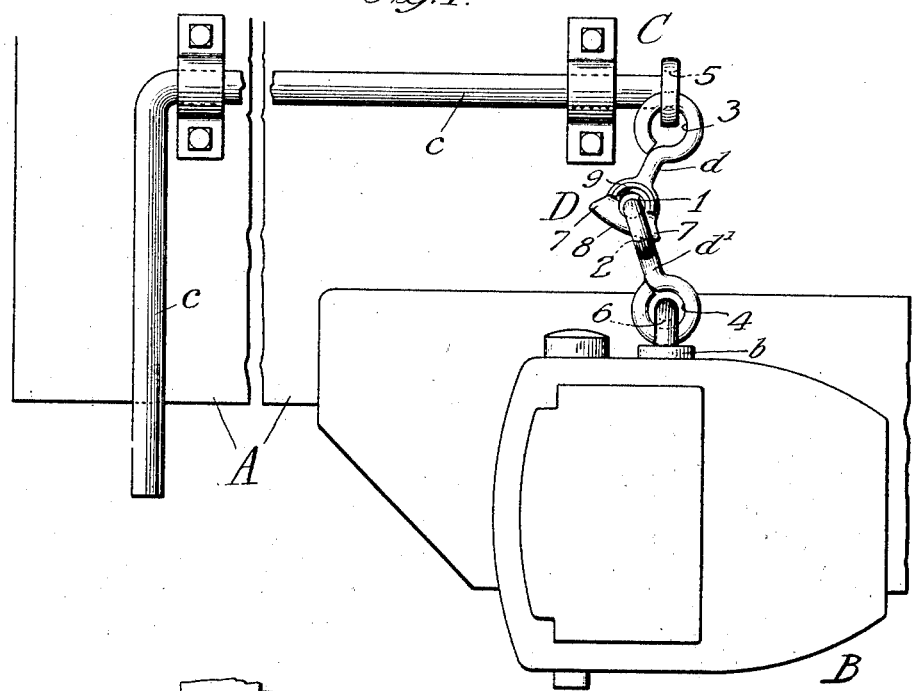
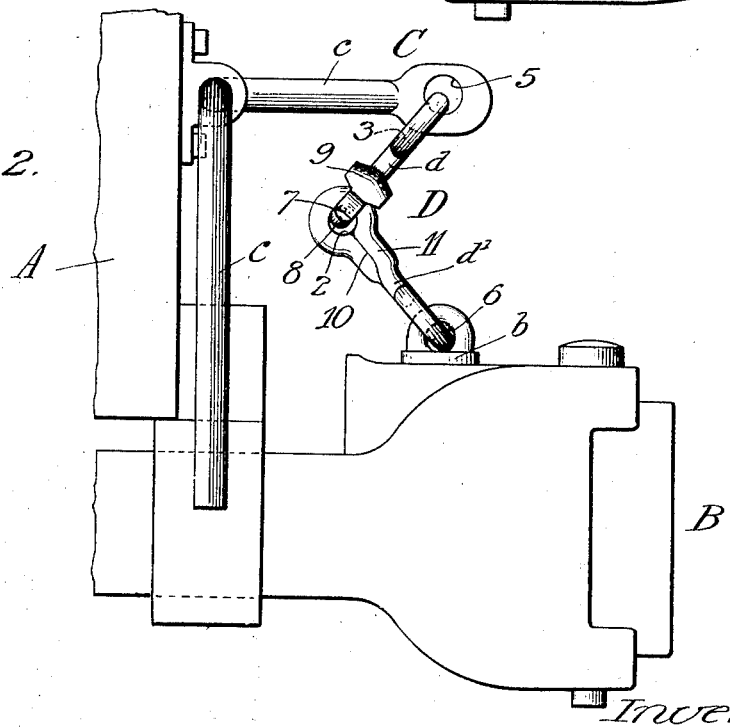
Witness
Martin H. Olsen.
Inventor
Charles W. Booth
By [signature]
Atty.

Nov. 11, 1930.   C. W. BOOTH   1,781,491
UNCOUPLING DEVICE
Filed Dec. 4, 1926   2 Sheets-Sheet 2
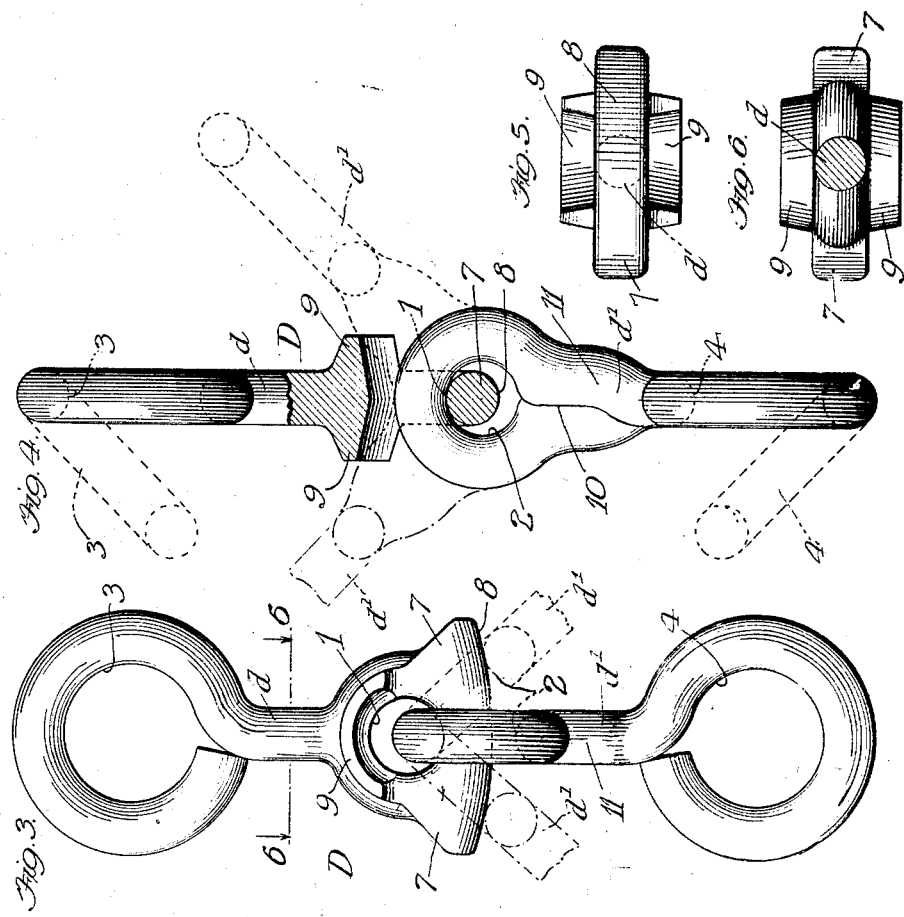
Witness
Martin H. Olsen.
Inventor
Charles W. Booth
By [signature]
Atty.

Patented Nov. 11, 1930

1,781,491

UNITED STATES PATENT OFFICE

CHARLES W. BOOTH, OF CHICAGO, ILLINOIS

UNCOUPLING DEVICE

Application filed December 4, 1926. Serial No. 152,570.

This invention relates to uncoupling devices for car couplers and relates particularly to such devices the links of which consist of two members only, each consisting of a shank having an eye at each end thereof shaped and proportioned to form rounded shoulders adjacent their juncture with said shank, eyes on different link members interlocking to connect said members end-to-end and the eyes on the remote ends of said link members being adapted to interlock with eyes formed, respectively, in the uncoupling lever and in the coupling pin, all of said eyes being proportioned and arranged to permit said link to flex freely in operation.

Prior to my present invention, uncoupling devices were known comprising a link consisting of two substantially similar members provided with interlocking eyes at their connected ends and with eyes at their remote ends adapted, respectively, to interlock with the eye in the arm of the operating lever and in the coupling pin, all of said eyes being of such large size that said link members will flex freely in all directions.

Experience has shown such links to be objectionable in the respect that under certain conditions, particularly when the knuckle of the coupler is turned into uncoupled position—in which position the lower end of the coupling pin will ride upon the flat upper surface of the knuckle and the members of the link being at substantially their maximum operating flexure—there is a tendency for the link members to turn so that they will kink, that is, to bring the eye of the lower link member into engagement with the rounded shoulder on the exterior of the eye of the upper link member formed at the juncture of the eye of said upper link member with the shank thereof, and which will operate, in an obvious manner, to shorten the operating length of the link and may prevent the coupling pin from falling into locking position when the knuckle of the coupler is turned into coupling position.

The object of the present invention is to overcome this objectionable feature.

Stated broadly, I attain the object of the invention by providing a link of this general type comprising means for limiting flexure of the link members in operation relative to each other to positions in which they cannot kink.

Specifically, flexure of the link in one direction is prevented by means of ribs on one of said members with which the shank of the other link member is adapted to contact when said links are in position of maximum flexure, and flexure of said link members in the opposite direction is limited by means of a lug formed at the connected end of one of said link members which is so proportioned that the inner side of the eye of the link member other than that on which said lug is formed will contact therewith when the link is in a position of maximum flexure in the direction controlled thereby.

A link for an uncoupling device embodying my invention and improvements also comprises the various other features, combination of features and details of construction hereinafter described and claimed.

In the accompanying drawings, in which my invention is fully illustrated:

Figure 1 is an end view of an uncoupling device embodying a link of my invention, shown as applied in use to a standard type of vertical plane coupler, the link being shown in position corresponding to locking position of the coupling pin.

Figure 2 is a side view thereof, showing the link flexed at approximately 90 degrees to its position shown in Figure 1.

Figure 3 is an enlarged detached front view of the link substantially as shown in Figure 1, with the link fully extended, the maximum flexure of the lower link member relative to the upper link member being indicated in dotted lines.

Figure 4 is an enlarged, detached side view of the link substantially as shown in Figure 2, but with the link fully extended, the maximum flexure of the lower link member relative to the upper link member being indicated in dotted lines and parts thereof being shown in section.

Figure 5 is a bottom plan view of the upper link member corresponding to its position shown in Figure 3, and Figure 6 is a sectional top plan view thereof on the line 6—6 of Figure 3.

I will first describe my invention with particular reference to Figures 1 to 6, inclusive, in which I have shown what I now consider to be its preferable embodiment.

In Figures 1 and 2, I have, for purposes of clear and definite illustrations, shown a railroad car, indicated by A, equipped with a usual type of vertical plane coupler, indicated by B, and an uncoupling device, designated as a whole C, embodying a link of my invention, designated as a whole D, for connecting the uncoupling lever $c$ with the coupling pin $b$.

The link D consists of two rigid members $d$, $d'$, connected end to end by interlocking eyes 1 and 2. Said link members are preferably made of round rod of steel or other suitable metal, which is of proper size in cross section to render the link sufficiently strong for its designed purpose. In practice I contemplate making said link members from steel rod approximately $\frac{9}{16}$ of an inch in diameter. The inside diameter of the eyes 1 and 2 which connect said link members are sufficiently larger than the size in cross section of the rod from which said link members are formed to permit said link members to flex freely in all directions without binding. In practice, I contemplate making the eyes 1 and 2 approximately $\frac{13}{16}$ of an inch in diameter, or about $\frac{1}{4}$ of an inch larger than the diameter of the rod from which the link members are made. This relation, however, admits of considerable variation without departing from my invention.

Formed at the remote ends of the link members $d$, $d'$, are eyes 3 and 4 which respectively engage corresponding eyes 5 and 6 formed in the ends of the uncoupling lever $c$ and in the projecting upper end of the locking pin $b$. To provide for conveniently attaching the eyes 3 and 4 on the link members to the eyes 5 and 6 on the uncoupling lever $c$ and on the locking pin $b$, said link members preferably will be supplied on order with the eyes 3 and 4 thereof, open, as shown in dotted lines in Figure 4, so that, to finish the connection after the eyes on the link members have been engaged with the eyes in the uncoupling lever and in the coupling pin, respectively, it will only be necessary to bend the offset portions of said eyes into closed position, which can be done cold.

In accordance with my invention, relative flexure of the link members $d$, $d'$, in the plane of Figure 3, is limited by means of what may be described as a pair of lugs 7 formed at the connected end of the link member $d$ and which project at opposite sides of the eye 1 in such position that when the link is flexed to bring the link member $d'$ into the position shown in dotted lines in Fig. 3, the lower side of the eye 2 will contact with one of said lugs, thus limiting flexure of said link. As shown, the sides of the lugs 7 are flat and the body portion of substantially the same thickness as the diameter of the link members $d$, $d'$.

Obviously the dimensions of the lugs 7 may be varied to provide for any desired flexure of the link members in the plane specified.

In accordance with my invention, also, relative flexure of the link member $d$, $d'$, in the plane of Figure 4—that is at right angles to the direction of flexure of the link members indicated in Figure 3—is limited by means of ribs 9 formed on opposite sides of the link member $d$, above the eye 1, said ribs as shown, being arcuate and substantially concentric with said eye. Relative flexure of the link members is limited by contact of the shank of the link member $d'$ with the ribs 9, the extreme flexure of said link members $d'$ being indicated in dotted lines in Figure 4. Obviously, by varying the position and height of the ribs 9, the relative flexure of the link members may be varied as desired.

In the preferable construction shown, also, the lengths of the lugs 7 and ribs 9 are so proportioned that flexure of the link member $d'$ in the plane of Figure 3 will be so limited that when the link members are flexed in the plane of Figure 4, the ribs 9 will always be in the path of movement of the link $d'$, thereby effectively preventing kinking of said link members in the manner described in the introductory portion of the specification.

The eye 1, the lugs 7, and the ribs 9 of the link member $d$ may conveniently be formed by usual forging processes, the rod from which said link member is formed being first upset, to provide necessary stock and being then brought to desired shape by means of suitable dies. Due to the fact that the eye 1, the lugs 7 and ribs 9, are made by forging operations they form a unitary structure integral with the link member $d$.

Also, the free end of the rod section forming the eye 2 is preferably welded or otherwise rigidly secured to the shank of said link member, thus rendering said eye very strong to withstand stresses which they will sustain in use, the line of weld connecting the free end of said link member to the shank thereof being substantially indicated by the line 10, Figures 2 and 4.

To still further increase the strength of the link member $d'$, adjacent to the eye thereof, the shank of said link member is preferably thickened in the plane of Figure 4, as shown at 11, the dimension of this portion, in the plane of Figure 3 being substantially equal to the thickness of the rod from which said link member is formed.

With the construction described it is obvious that it will be impossible to turn the link members $d$, $d'$, so that the eye 1 will rest upon the shoulder formed at the juncture of the eye 1 with the shank of said link member, thereby effectively preventing kinking of the link in the manner described.

I claim:

1. A link adapted for connecting the uncoupling lever of a car coupler with the coupling pin thereof, consisting of two members only, each consisting of a shank and an eye at each end thereof shaped and proportioned to form rounded shoulders adjacent their juncture with said shank, eyes on different members interlocking to connect said link members end-to-end and the eyes in the remote ends of said link members being adapted to interlock with eyes formed, respectively, in the uncoupling lever and in the coupling pin, all of said eyes being proportioned and arranged to permit said link to flex freely in operation, and a pair of lugs formed at that end of one link member which is connected to the second link member and which project at opposite sides of the eye formed therein in position to contact with the eye of said second link member when said link is flexed to its contemplated limit at an angle to the plane of the eye of said second link member.

2. A link adapted for connecting the uncoupling lever of a car coupler with the coupling pin thereof, as specified in claim 1, which also comprises ribs on one link member positioned adjacent the eye therein which interlocks with the eye in the second link member and at the side of said eye remote from said second link member, positioned to contact with a rigid part of said second link member when said link is flexed to its contemplated limit at an angle to the plane of the eye of the link member on which they are formed.

3. A link adapted for connecting the uncoupling lever of a car coupler with the coupling pin thereof, consisting of two members only, said members being connected end-to-end by interlocking eyes and being provided with eyes in their remote ends, adapted to interlock with eyes formed, respectively, in the uncoupling lever and in the upper end of the coupling pin, all of said eyes being shaped and proportioned to permit said link to flex freely in operation, and ribs on one link member adjacent the eye therein which interlocks with the eye in the second link member and at the side of said eye remote from said second link member, positioned to contact with a rigid part of said second link member when said link is flexed to its contemplated limit at an angle to the plane of the eye of the link member on which they are formed.

In witness that I claim the foregoing as my invention, I affix my signature this 29th day of November, A. D. 1926.

CHARLES W. BOOTH.